United States Patent
Kajiwara et al.

(10) Patent No.: US 8,871,402 B2
(45) Date of Patent: Oct. 28, 2014

(54) FUEL CELL SYSTEM

(75) Inventors: Shigeto Kajiwara, Okazaki (JP);
Tetsuya Bono, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 929 days.

(21) Appl. No.: 12/680,963

(22) PCT Filed: Sep. 24, 2008

(86) PCT No.: PCT/JP2008/067182
§ 371 (c)(1),
(2), (4) Date: Mar. 31, 2010

(87) PCT Pub. No.: WO2009/044656
PCT Pub. Date: Apr. 9, 2009

(65) Prior Publication Data
US 2010/0221630 A1 Sep. 2, 2010

(30) Foreign Application Priority Data

Oct. 1, 2007 (JP) ................................. 2007-257735

(51) Int. Cl.
*H01M 8/04* (2006.01)
(52) U.S. Cl.
CPC ...... *H01M 8/04313* (2013.01); *H01M 8/04634* (2013.01); *H01M 2250/20* (2013.01); *H01M 8/04753* (2013.01); *Y02T 90/32* (2013.01); *H01M 8/0432* (2013.01); *Y02E 60/50* (2013.01); *H01M 8/04783* (2013.01)
USPC ........... 429/443; 429/428; 429/447; 429/512; 429/513
(58) Field of Classification Search
CPC .............. Y02E 60/50; H01M 8/04753; H01M 8/04223; H01M 2250/20; H01M 8/04313; H01M 8/0432; H01M 8/04634; H01M 8/04783
USPC .................................................. 429/400–535
See application file for complete search history.

(56) References Cited

U.S. PATENT DOCUMENTS

| 6,223,844 B1 * | 5/2001 | Greenhill et al. ............. 429/429 |
| 2003/0162065 A1 * | 8/2003 | Miyauchi et al. ............... 429/26 |

(Continued)

FOREIGN PATENT DOCUMENTS

| JP | 62-006640 U | 1/1987 |
| JP | 07-272737 A | 10/1995 |

(Continued)

OTHER PUBLICATIONS

Office Action issued May 31, 2012 in Chinese Patent Application No. 200880109677.1 and partial English translation thereof.

*Primary Examiner* — Milton I Cano
*Assistant Examiner* — Ling R Zeng
(74) *Attorney, Agent, or Firm* — Kenyon & Kenyon LLP (57) ABSTRACT

In a fuel cell system, it is possible to suppress fixation of a fluid circulating device arranged in a fluid passage connected to a fuel cell main body. The fuel cell system is provided with a fuel cell stack, a system main body having respective elements for supplying a fuel gas and respective elements for supplying an oxidizing gas, and a control device. The control device includes a fluid circulating device drive processing unit having a function to forcibly drive the fluid circulating device after determining, based on a judgment related to one or more of a non-use time, an operation state of the system main body, a membrane impedance state of a fuel cell, a temperature of the fuel cell stack, and a background noise, whether or not forced driving to suppress sticking of the fluid circulating device is preferable at that time.

4 Claims, 3 Drawing Sheets

(56) References Cited

U.S. PATENT DOCUMENTS

| | | | |
|---|---|---|---|
| 2004/0151956 A1* | 8/2004 | Orihashi et al. | 429/13 |
| 2007/0072016 A1* | 3/2007 | St-Pierre et al. | 429/13 |
| 2008/0077802 A1* | 3/2008 | Richardson et al. | 713/189 |
| 2009/0214901 A1* | 8/2009 | Dong et al. | 429/14 |

FOREIGN PATENT DOCUMENTS

| | | |
|---|---|---|
| JP | 2001-336803 A | 12/2001 |
| JP | 2004-039526 A | 2/2004 |
| JP | 2004-207093 A | 7/2004 |
| JP | 2005-251576 A | 9/2005 |
| JP | 2006-194097 A | 7/2006 |
| JP | 2006-302746 A | 11/2006 |
| JP | 2006-310209 A | 11/2006 |
| JP | 2006-324066 A | 11/2006 |
| JP | 2007-165073 A | 6/2007 |
| JP | 2007-184199 A | 7/2007 |
| WO | 2006/064955 A1 | 6/2006 |
| WO | 2006/095606 A1 | 9/2006 |
| WO | 2007/091137 A1 | 8/2007 |

* cited by examiner

FUEL CELL SYSTEM

This is a 371 national phase application of PCT/JP2008/067182 filed 24 Sep. 2008, claiming priority to Japanese Patent Application No. JP 2007-257735 filed 1 Oct. 2007, the contents of which are incorporated herein by reference.

BACKGROUND

1. Technical Field

The present invention relates to a fuel cell system, and more particularly to a fuel cell system including a fluid circulating device which is disposed in a fluid passage connected to a fuel cell main body.

2. Related Art

An advantage of installing batteries comprised of fuel cells on in vehicles is that their impact on the environment is relatively small. Fuel cells generate required electric power by, for example, reacting a fuel gas such as hydrogen supplied to an anode side of a fuel cell with an oxidizing gas such as air supplied to a cathode side, causing a reaction through an electrolyte membrane. Because heat is generated as a result of such a reaction, a coolant such as cooling water is circulated through the fuel cell stack, so that a radiator or the like may be used to cool the stack.

Thus, such a fuel cell system comprises a fuel cell stack and a fuel gas passage, an oxidizing gas passage, a cooling water passage, and the like connected thereto. Typically, the fluid passages are each provided with one or both of a valve for controlling fluid flow, or a fluid circulating device such as a drive device, a pump, or a compressor.

For example, JP-A 2005-251576 (Patent Document 1) discloses a fuel cell system comprising an atomizer having an ultrasonic transducer for atomizing the water in an air exhaust system, in which a gate valve is operated to switch between a bypass supply pipe and a bypass exhaust pipe in order to provide a bypass state for a humidifier, and an air compressor is driven to scavenge.

If such a fluid circulating device does not operate, the operation of the fuel cell system may be hindered; various measures have been employed to deal with failure of such devices. For example, JP-A 2006-310209 (Patent Document 2) discloses a fuel cell system in which, if electric power is not supplied from a storage battery which has discharged after a long period of non use, the storage battery is recharged by external energy from a manual power generator or the like, thereby the fuel cell battery is activated.

Patent Publication JP-A 2001-336803 (Patent Document 3) does not directly relate to fuel cells, but discloses a temperature-control device in which an ON-OFF valve within a coolant circulating passage may be fixed in a closed state if it is not used or put in a stopped state for a long period. This' publication discloses that the ON-OFF valve is forcibly opened when the operation is stopped for a predetermined period, and a pump is used to forcibly circulate remaining coolant.

SUMMARY

Problems to be solved by the Invention

Various types of fluid circulating devices are provided in fuel cell systems as described above. Since these devices do not operate when the fuel cell battery does not operate, the circulating device could become frozen or stuck if, for example, water freezes under low temperature or the like condition. If the fluid circulating device is stuck, the operation of the fuel battery will be affected. Patent Document 3 considers freezing of an ON-OFF valve in a water circulating passage of a temperature control device, but this invention cannot be adapted for use with a fuel cell battery which employs an electrochemical reaction for power generation.

The present invention provides a fuel cell system that can prevent an operational failure due to freezing of a fluid circulating device arranged in a fluid passage connected to a fuel cell main body.

Means for solving the Problems

According to one aspect of the invention, there is provided a fuel cell system, comprising a fluid circulating device disposed in a fluid passage connected to a fuel cell main body, and forcible drive means for forcibly driving the fluid circulating device at a rate of once every predetermined one or more operation trips of a fuel battery which are counted.

According to an aspect of the invention, there is provided a fuel cell system, comprising a fluid circulating device disposed in a fluid passage connected to a fuel cell main body, and forcible drive means which forcibly drive the fluid circulating device when a non-use time of the fluid circulating device exceeds a predetermined time.

It is preferable that the forcible drive means of the fuel cell system according to the invention forcibly drive the fluid circulating device during a steady operation of the fuel cell main body.

It is preferable that the fuel cell system according to the invention further comprises means for detecting a temperature of the fuel cell main body, wherein the forcible drive means prohibit forcible drive of the fluid circulating device when the fuel cell main body has a temperature higher than a predetermined temperature value.

It is preferable that the fuel cell system according to the invention further comprises means for detecting the impedances of fuel battery cells configuring the fuel cell main body, wherein the forcible drive means prohibit forcible drive of the fluid circulating device when the fuel battery cells have an impedance higher than a predetermined value.

It is preferable that the fuel cell system according to the invention further comprises means for measuring a value of a factor which is associated amount related to background noise, wherein the forcible drive means forcibly drive the fluid circulating device when it is judged that the background noise exceeds predetermined value, based on the measured value related to the background noise.

EFFECTS OF THE INVENTION

According to at least one of the above-described structures, the fuel cell system forcibly drives the fluid circulating device at least once every so many trips, which are one or more trips in which the fuel cell battery is operated. The fuel cell system might be provided with a fluid circulating device and the like which are normally operated only under certain conditions such as a low temperature, and are not driven unless they are exposed to these specific conditions. Thus, even if the fuel cell system is operated, the fluid circulating device may not necessarily be driven, increasing the likelihood that the fluid circulating device will become stuck due to extend non-use. By employing a configuration as described above, the fluid circulating device is forcibly driven at least once during each prescribed number of trips, thereby greatly reducing the likelihood of operational failure due to sticking of the circulating device.

By employing at least one of the above-described structures, the fuel cell system forcibly drives the fluid circulating device when the idle time of the fluid circulating device exceeds a predetermined amount of time. In this manner, the likelihood of, for example, a sealing surface of the forcible drive means such as an ON-OFF valve becoming stuck due to a long period of non-use can be greatly reduced.

In a fuel cell system employing the present invention, because the fluid circulating device is forcibly driven during steady operation of the fuel cell main body, treatment to inhibit sticking can be performed without extending the operation time of the fuel cell battery.

In a fuel cell system employing the present invention, when the fuel cell main body has a high temperature exceeding a predetermined temperature range, forced driving of the fluid circulating device is prohibited. When the fuel cell main body has a high temperature, for example, the saturated steam pressure of the oxidizing gas is high, and the fuel battery is in a dry state. By employing a configuration as described above, further undesirable drying of dry fuel cells can be prevented.

In a fuel cell system employing the present invention, when the impedance of the fuel cell battery exceeds a predetermined value, forced driving of the fluid circulating device is prohibited. When the fuel cell battery has a high impedance, the fuel cells are in a dry state. By employing a configuration as described above, further undesirable drying of dry fuel cells can be prevented.

In a fuel cell system employing the present invention, the fluid circulating device is forcibly driven when it is judged that background exceeds a predetermined value, as determined based on a measured value related to the background noise. Thus, noise when the fluid circulating device is forcibly driven can be made unnoticeable.

EXPLANATION OF REFERENCE NUMERALS

10: Fuel cell system, 20: system main body, 22: fuel cell stack, 24: hydrogen gas source, 26: ON-OFF valve, 28: regulator, 30: injector, 32: circulation booster, 33: flow divider, 34: hydrogen exhaust valve, 36: diluter, 40: oxygen supply source, 42: filter, 44: ACP, 46: humidifier, 48: FC inlet shut valve, 50: humidifier bypass valve, 52: pressure regulating valve, 54: FC outlet shut valve, 56: humidifier bypass passage, 58: cooling water passage, 60: outside air thermometer, 62: flow meter, 64: pressure gauge, 66: cooling water thermometer, 68: current detector, 70: voltage detector, 80: control device, 82: mode switch, 84: vehicle speed sensor, 86: FC operation control unit, 88: fluid circulating device drive processing unit, 90: unused time judgment module, 92: operation mode judgment module, 94: impedance judgment module, 96: FC temperature judgment module, 98: background noise judgment module.

Detailed Description

An embodiment of the present invention is described in detail below with reference to the drawings. In the illustrated example, a fuel cell system to be mounted on a vehicle is described below, but this system may be a fuel cell system which is not operated continuously but only on demand, or may be a fuel cell system intended for uses other than in vehicles. Although a fuel cell system having a fuel cell main body of a solid polymer electrolyte membrane type using hydrogen for the fuel gas and the atmosphere for the oxidizing gas, is described below, the present invention may be applied to fuel cell systems having other types of fuel cell main body using other types of gas and other types of electrolyte membranes, as long as it is provided with a fluid circulating device which is disposed in a fluid passage connected to the fuel cell main body. A humidifier bypass valve drive device which is disposed as a fluid circulating device in a humidifier bypass passage for bypassing the humidifier is described below as one example among many fluid circulating devices, and the present invention may employ another device, such as a drive device for another ON-OFF valve or an adjusting valve, an air compressor (ACP) for an oxidizing gas, a fluid circulating device such as a hydrogen pump for a fuel gas, or the like.

Figure 1:
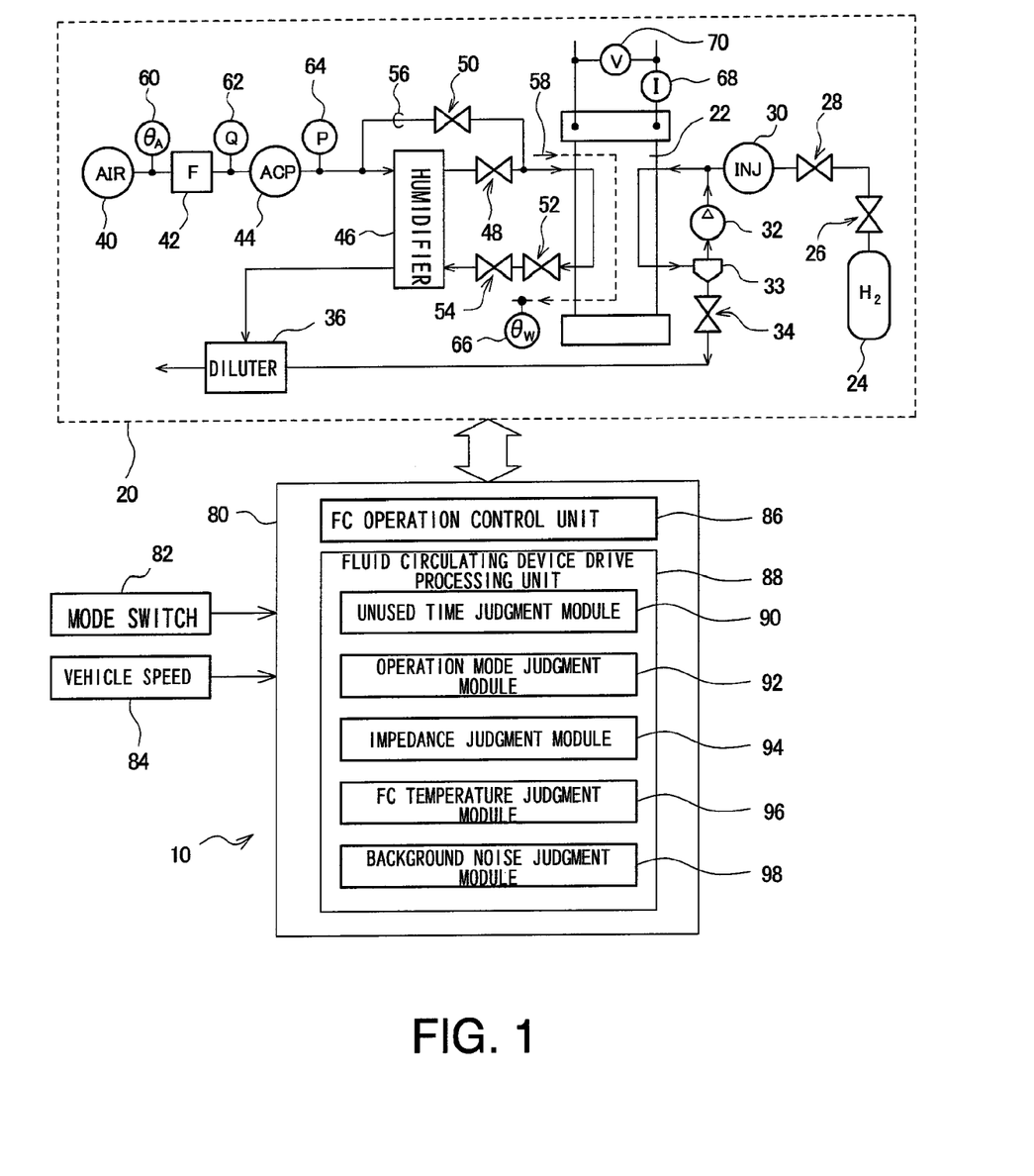
FIG. 1 is a configuration view of a fuel cell system according to an embodiment of the invention.

FIG. 1 shows the configuration of a fuel cell system 10. The fuel cell system 10 is configured to include a system main body 20, and a control device 80 for controlling as a whole system the individual elements of the system main body 20.

The system main body 20 is configured to include a fuel cell main body which has fuel cells stacked into plural layers and is called a fuel cell stack 22, individual elements arranged on an anode side of the fuel cell stack 22 to supply a hydrogen gas as the fuel gas, and individual elements arranged on a cathode side to supply air as the oxidizing gas.

The fuel cell stack 22 is configured to be a battery pack supplying a desired high voltage in which the fuel battery cells each having a small output voltage are stacked into plural layers. Each fuel cell is a unit cell which generates electric power by a reaction between hydrogen and oxygen within the cell including a membrane electrode assembly (MEA), which is a stacked body of a solid electrolyte membrane and a catalyst layer, by supplying hydrogen as the fuel gas to the anode side of the MEA, and supplying air containing oxygen to the cathode side. When this is done, water is discharged from the cathode side as a product of the reaction. In this example, the fuel cell has an output voltage of about 1.4V, and, to obtain an output voltage of, for example 300V, 200 or more fuel battery cells are stacked to create a fuel cell stack.

A hydrogen gas source 24 on the anode side is a tank for supplying hydrogen as the fuel gas. The hydrogen gas source 24 is connected to an injector 30 via an ON-OFF valve 26 and a regulator 28. The ON-OFF valve 26 controls whether or not hydrogen is supplied from the hydrogen gas source 24, and the regulator 28 and the injector 30 have functions to adjust the gas from the hydrogen gas source 24 to have an appropriate pressure and flow rate. An output port of the injector 30 is connected to an anode-side inlet of the fuel cell stack 22, and the fuel gas adjusted to have the appropriate pressure and flow rate is supplied to the fuel cell stack 22.

The gas discharged from the anode-side outlet of the fuel cell stack 22 has a low hydrogen concentration because the hydrogen is consumed for power generation, and a high impurity gas concentration because nitrogen gas, which is a component of air on the cathode side, permeates through the MEA. The reaction product water also permeates through the MEA.

A flow divider 33 has a function of separating the exhaust gas from the anode-side outlet and directing it to flow to a circulation booster 32 and a hydrogen exhaust valve 34. Because the hydrogen exhaust valve 34 is normally closed, the exhaust gas from the anode-side outlet is returned to the circulation booster 32.

The circulation booster 32 is a hydrogen pump having a function of recycling the gas which is returned from the anode-side outlet by increasing the hydrogen partial pressure of the gas and returning it to the anode-side inlet. Thus, the impurity gas concentration of the exhaust gas is increased gradually as the hydrogen gas is re-circulated by the circulation booster 32.

The hydrogen exhaust valve 34 has a function of directing the flow of the exhaust gas to a diluter 36 by opening at an appropriate time when the impurity gas concentration of the exhaust gas from the anode-side outlet has increased. Here, the exhaust gas is a hydrogen gas which contains nitrogen and also water as a reaction product.

An oxygen supply source 40 on the cathode side is an oxidizing gas source, and, in practice, environmental air can be used. The air as the oxygen supply source 40 is supplied to the cathode side through a filter 42.

An outside air thermometer 60 which is disposed before the filter 42 is means having a function to detect a temperature of the oxidizing gas, but it is also means for detecting a temperature ($\theta_A$) of the air which is the oxidizing gas source, namely a temperature of the environment where the fuel cell system 10 is disposed. Detected data is transmitted to the control device 80, where as a result, for example, an operation mode of the fuel cell system is changed or the like.

For example, when the air temperature is low, the operation conditions of the fuel cell system 10 are substantially different from those at a normal temperature. For example, in a low temperature environment of below freezing or the like, it is necessary to prevent freezing of moisture or the like in an oxidizing gas passage of the fuel cell system 10. As such, because power generation efficiency is reduced when the fuel cell stack 22 is in a low temperature state, it is necessary to raise the temperature of the coolant in order to warm the system. Therefore, the fuel cell system 10 has a low-temperature mode and a normal temperature mode as operation modes.

Figure 2:
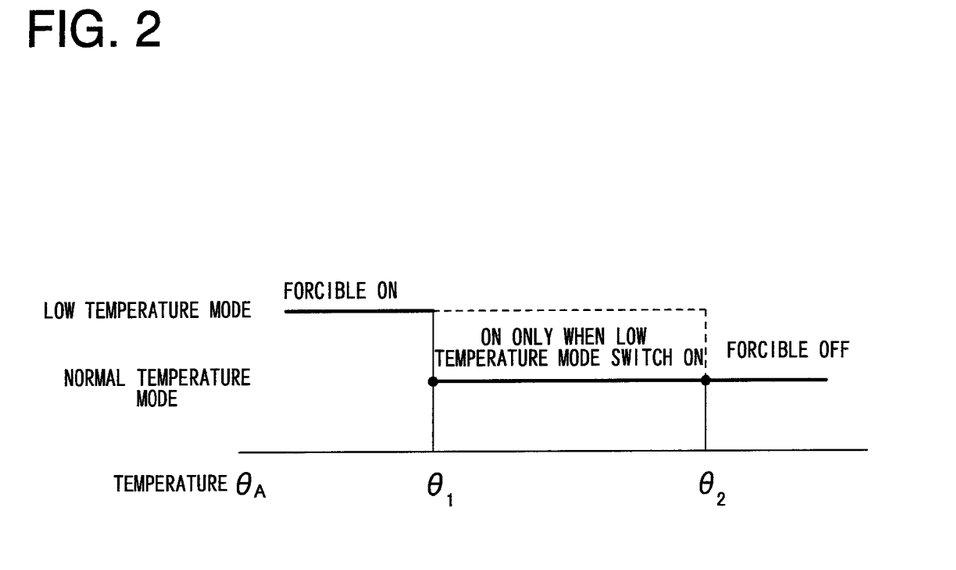
FIG. 2 is a diagram illustrating an operation state of switching between a low-temperature mode and a normal temperature mode according to the embodiment of the invention.

FIG. 2 is a diagram illustrating an operation state of switching between the low-temperature mode and the normal temperature mode. The horizontal axis represents the air temperature ($\theta_A$), and the vertical axis represents the low-temperature mode and the normal temperature mode. For example, the low-temperature mode is forcibly switched on at temperature $\theta_1$ or below, which is a low temperature of below freezing as shown in the drawing, and the low-temperature mode is forcibly switched off when the temperature increases to temperature $\theta_2$ or more, which is a near normal temperature, to automatically resume the normal temperature mode. In the temperature range between the temperature $\theta_1$ and the temperature $\theta_2$, the low-temperature mode is normally switched off and the operation is performed in the normal temperature mode, but when the user operates a mode switch 82 as described below to switch on the low-temperature mode switch, the low-temperature mode is continued while the switch is on.

Referring again to FIG. 1, a flow meter 62 which is disposed in the flow path after the filter 42 detects a total supply flow rate of the oxidizing gas from the oxygen supply source 40.

An air compressor (ACP) 44 is a gas booster which compresses the volume of the oxidizing gas by an unshown motor to increase its pressure. The ACP 44 has a function of providing a predetermined amount of oxidizing gas by varying its rotational speed (revolutions per minute) under control of the control device 80. In other words, when a required flow rate of the oxidizing gas is large, the rotational speed of the motor is raised, and when the required flow rate of the oxidizing gas is low, the rotational speed of the motor is lowered. Thus, the rotational speed of the motor is varied to control the supply of the oxidizing gas. A pressure gauge 64 disposed next to the ACP 44 has a function of detecting a pressure of the oxidizing gas.

A humidifier 46 has a function of ensuring that the oxidizing gas has a proper amount of moisture to enable performing a fuel battery reaction by the fuel cell stack 22. The humidifier 46 is also referred to as a moisturization module. The feed gas appropriately moisturized by the humidifier 46 is fed to a cathode-side inlet of the fuel cell stack 22 to cause an electrochemical reaction in the fuel cell stack 22, and is then discharged from a cathode-side outlet, along with water produced by the reaction. Because the fuel cell stack 22 becomes hot because of the reaction, the water is discharged as steam and fed to the humidifier 46 to appropriately moisturize the oxidizing gas fed from the ACP 44 to the fuel cell stack 22. Because the humidifier 46 has a function of providing appropriate moisture to the feed gas as described above, a gas exchanger using a so-called hollow fiber can be used.

The oxidizing gas appropriately moisturized by the humidifier 46 is fed to the oxidizing gas inlet of the fuel cell stack 22, but an FC inlet shut valve 48 is disposed before the oxidizing gas inlet. The FC inlet shut valve 48 is a shut valve, which is in an open state together with an FC outlet shut valve 54 which will be described below when the fuel cell stack 22 is operating and becomes a closed state when the fuel cell stack 22 is stopped. The shut valve is an ON-OFF valve which is different from a valve such as an adjusting valve capable of varying a flow rate and can have two states which are an open state and a closed state.

A humidifier bypass passage 56 is disposed to connect the ACP 44 with the oxidizing gas inlet of the fuel cell stack 22 bypassing the humidifier 46. A humidifier bypass valve 50, which is disposed in the middle of the humidifier bypass passage 56, is a shut valve which is normally in a closed state and changed to an open state under control of the control device 80 when necessary.

When the humidifier bypass valve 50 is opened, a high-pressure oxidizing gas which has not been moisturized is fed directly from the ACP 44 to the fuel cell stack 22 through the humidifier bypass passage 56. Thus, the oxidizing gas passage in the fuel cell stack 22 can be forcibly scavenged. The FC inlet shut valve 48 is preferably in a closed state when the humidifier bypass valve 50 is opened so as to prevent the high-pressure oxidizing gas from flowing back to the humidifier 46.

A pressure regulating valve 52 which is disposed at the oxidizing gas outlet of the fuel cell stack 22 is also referred to as a back pressure valve, and has a function of adjusting the gas pressure at the oxidizing gas outlet (the cathode-side outlet), to adjust a flow rate of the feed gas to the fuel cell stack 22. A valve such as a butterfly valve capable of adjusting an effective aperture of the passage can be used for the pressure regulating valve 52.

The FC outlet shut valve 54 which is disposed after the pressure regulating valve 52 is a shut valve which is in an open state when the fuel cell stack 22 is operating and in a closed state when the fuel cell stack 22 is stopped as described above. The FC outlet shut valve 54 and the above-described FC inlet shut valve 48 are valves which can seal the cathode side of the fuel cell stack 22 by closing when the operation of the fuel cell stack 22 is stopped. Thus, a catalyst or the like can be prevented from being oxidized when the fuel cell stack 22 is not operating.

When the FC outlet shut valve 54 is in an open state, the oxidizing gas outlet of the fuel cell stack 22 is connected to the humidifier 46 via the pressure regulating valve 52, so that the gas from the fuel cell stack 22 is used to feed steam to the humidifier 46, returns to enter the diluter 36, and is then discharged outside.

The diluter 36 is a buffer vessel which collects the exhaust gas and hydrogen gas containing water discharged from the hydrogen exhaust valve 34 on the anode side and also the exhaust gas containing the steam and hydrogen gas leaked from the MEA on the cathode side, and discharges these gases to the atmosphere after adjusting the concentration of hydrogen to an appropriate level. A configuration in which a direct passage is disposed to directly connect the ACP 44 and the diluter 36 bypassing the humidifier 46 may be employed, and an appropriate valve can be disposed in the direct passage and caused to become an open state as required to further lower the hydrogen concentration for dilution.

A cooling water passage 58 which is disposed in the fuel cell stack 22 is provided to keep the fuel cell stack 22 at a temperature suitable for the electrochemical reaction. The cooling water passage 58 circulates an appropriate coolant between an unshown heat exchanger such as a radiator and the fuel cell stack 22, and a circulation pump which is one of the fluid circulating devices is disposed on the passage. A cooling water thermometer 66 which is disposed on the cooling water passage 58 is means for detecting a cooling water temperature ($\theta_W$) which indicates a temperature of the fuel cell stack 22. The detected data is transmitted to the control device 80 and used, for example, as one of opening/closing conditions of the humidifier bypass valve 50.

Figure 3:
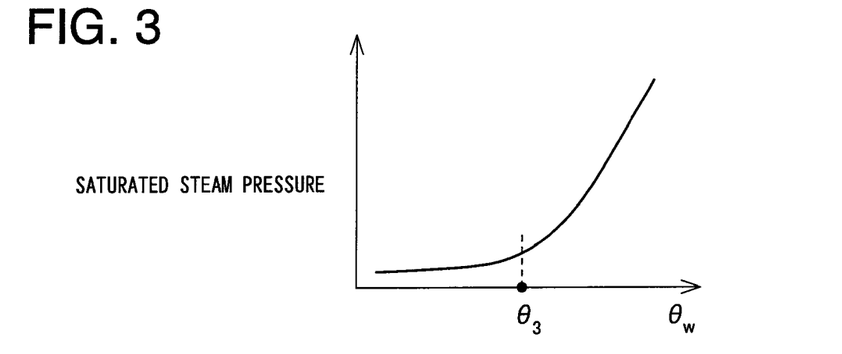
FIG. 3 is a diagram schematically showing a relationship between a temperature and a saturated steam pressure in a gas.

FIG. 3 is a diagram schematically showing a relationship between a temperature and a saturated steam pressure in the gas with the cooling water temperature ($\theta_W$) represented by the horizontal axis and the saturated steam pressure in the atmosphere represented by the vertical axis. As shown in the drawing, when the temperature rises, the saturated steam pressure increases. In other words, the oxidizing gas has a low humidity at a high temperature and a high humidity at a low temperature. If it is necessary to supply the oxidizing gas to the fuel cell stack 22 for any object other than power generation, it is more preferable that the oxidizing gas have a high humidity than a low humidity because the fuel cell stack 22 has a tendency do become too dry when a low humidity oxidizing gas is continuously supplied.

For example, because oxidizing gas which has not passed through the humidifier 46 is fed into the fuel cell stack 22 when the humidifier bypass valve 50 is opened, the fuel cell stack 22 has a tendency to continuously dry out if the oxidizing gas has a low humidity. Therefore, when the humidifier bypass valve 50 is opened, it is preferable that the cooling water temperature ($\theta_W$) is low. Generally, if it is necessary to supply the oxidizing gas to the fuel cell stack 22 for any object other than the power generation, it is preferable that the fuel cell stack 22 has a low temperature. Here, "low temperature" is used to refer to a temperature below a temperature at which the saturated steam pressure starts to rise quickly together with the temperature. For example, when the oxidizing gas temperature is in a range of about 40 degrees C. to about 50 degrees C., it is preferable that the oxidizing gas is supplied to the fuel cell stack 22 for any object other than the power generation.

Referring again to FIG. 1, a current detector 68 and a voltage detector 70 are disposed on the fuel cell stack 22 as means for detecting a state of power generation of the fuel cell stack 22. The detected data is transmitted to the control device 80 and reflected in the operation control of the operation of the fuel cell system 10. The current detector 68 and the voltage detector 70 are also used to calculate a membrane resistance or a membrane impedance of the fuel battery cell. The membrane resistance or the membrane impedance is a characteristic value which reflects the state of wetness or dryness of the fuel battery cell. Among the methods that can be employed to calculate the membrane resistance or the membrane impedance, are a direct current method which simply divides a voltage value by a current value, an alternating current method which superimposes a high-frequency component on a voltage signal or the like and measures the response by a current signal, and other methods.

Figure 4:
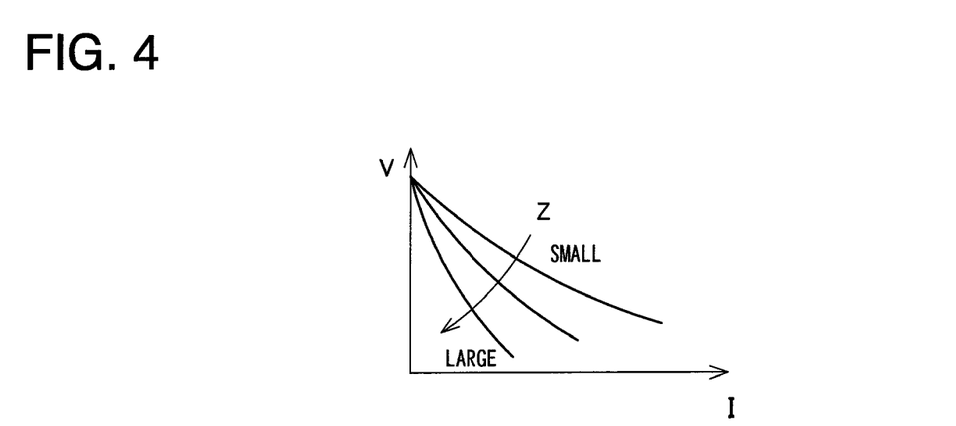
FIG. 4 is a diagram illustrating a state of a membrane resistance or membrane impedance Z, in which current is represented by the horizontal axis and voltage is represented by the vertical axis.

FIG. 4 is a diagram illustrating a state of membrane resistance or membrane impedance Z, with the detected value of the current detector 68 represented by the horizontal axis, and the detected value of the voltage detector 70 represented by the vertical axis. As shown in FIG. 4, a voltage-current characteristic of the fuel battery cell does not change linearly; when the membrane impedance Z is small, the current value becomes larger than in a case in which the membrane impedance Z is large, even if the voltage value is the same. This makes it possible for the membrane resistance or the membrane impedance to be evaluated by the current detector 68 and the voltage detector 70.

Referring again to FIG. 1, the mode switch 82 connected to the control device 80 is a selection switch for the low-temperature mode described in connection with the outside air thermometer 60. When the mode switch 82 is operated at a temperature between the temperature $\theta_1$ and the temperature $\theta_2$ as described above with reference to FIG. 2, the normal temperature mode is switched to the low-temperature mode. The mode switch 82 is operated by the user.

A vehicle speed sensor 84 is means for detecting a running speed of the vehicle. The running speed obtained by the vehicle speed sensor 84 is used for operation control and the like of the vehicle, but it is also used here for evaluation of the background noise in the vehicle. For example, when vehicles running at a high speed and a low speed are compared, the former is more likely to have a background noise level which the operator will perceive to be loud.

The control device 80 has a function to control the operation of the individual components of the system main body 20 as a whole. That is, the control device 80 has a function of obtaining a desired power generation operation by controlling the operation of the ACP 44 and the like in accordance with an external demand for power generation and by feeding the oxidizing gas and the fuel gas to the fuel cell stack 22. This function is conducted by an FC operation control unit 86. The control device 80 particularly has a function of performing drive processing such that the fluid circulating device does not stick. This function is performed by a fluid circulating device drive processing unit 88.

The fluid circulating device drive processing unit 88 is comprised of an unused time judgment module 90 which judges whether or not drive processing should be performed on an unused time of the fluid circulating device, an operation mode judgment module 92 which judges whether or not an operation of the system main body 20 is in a state suitable for the drive processing, an impedance judgment module 94 which judges whether or not the membrane impedance of the fuel battery cell is in a state suitable for the drive processing, an FC temperature judgment module 96 which judges whether or not a temperature of the fuel cell stack 22 is suitable for the drive processing, and a background noise judgment module 98 which judges whether or not the background noise is suitable for the drive processing.

The control device 80 can be configured by an appropriate control computer. The above-described individual functions can be realized by software, and more specifically by software which when executed by the computer performs corresponding fuel battery control functions.

Figure 5:
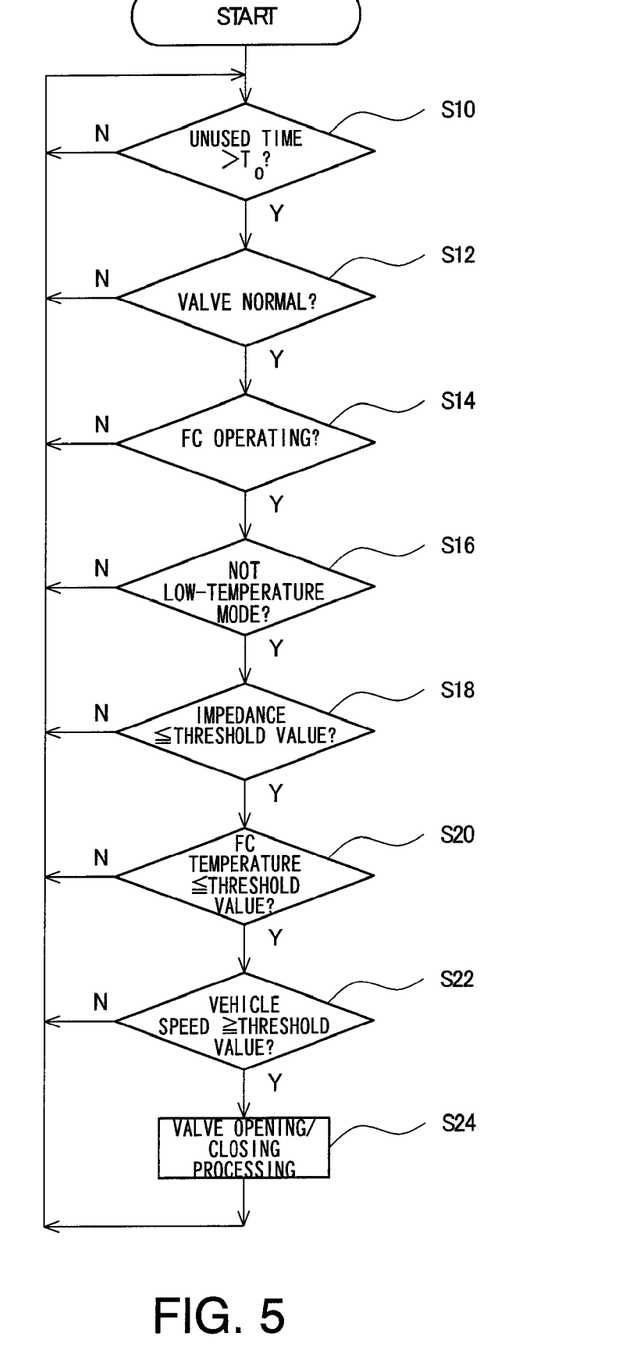
FIG. 5 is a flowchart showing a procedure for preventing sticking of a fluid circulating device in a system main body of fuel cell system according to the embodiment of the invention.

The action of the above configuration, and particularly the individual functions of the fluid circulating device drive processing unit 88 of the control device 80 are described in detail with reference to the flowchart of FIG. 5. FIG. 5 is a flowchart showing a procedure for preventing sticking of the fluid circulating device of the system main body 20 of the fuel cell system 10, and the individual procedures correspond to individual processing steps of the processing program in the corresponding fuel battery control program. As an example of the fluid circulating device, the drive device of the humidifier bypass valve 50 will be used in the following description.

When the program for preventing sticking of the fluid circulating device is activated, it is first judged whether or not the time since the device was last used (unused time) exceeds a threshold value $T_0$ (S10). This step is performed by the unused time judgment module 90 of the fluid circulating device drive processing unit 88 of the control device 80. The unused time is determined by storing a time when the humidifier bypass valve 50 becomes an open state and calculating the time period from the time elapsed since the bypass valve 50 was last in an open state last. The threshold value $T_o$ can be preset according to the operation specifications of the fuel cell system 10, the specifications of the humidifier bypass valve 50, or the like. For example, if it is predicted that the humidifier bypass valve 50 may become stuck or frozen if not used for about one week, $T_0$ can be set to about 100 hours.

Because the threshold value $T_0$ related to the unused time is set such that the humidifier bypass valve 50 does not stick, it may be decided by another way other than setting of the prescribed time. For example, one operation of the fuel cell system 10 may be considered one trip as used to calculate the operation frequency of the fuel cell system 10, and a certain number of trips may be set as a threshold value. For example, if it is desired that the humidifier bypass valve 50 be forcibly driven once each trip, the threshold value can be set to one trip.

When it is judged in S10 that the unused time exceeds the threshold value $T_0$, it is next judged next whether or not the valve is operating normally (S12). For example, if a drive circuit or the like has a short-circuit fault in the drive device of the humidifier bypass valve 50, forcible drive is not performed. Appropriate electrical or mechanical checking means for the drive device of the humidifier bypass valve 50 can be employed to determine whether or not the valve is in a normal state. For example, whether or not the current value of the drive circuit is normal may be checked. If the judgment at S12 is NO, the procedure returns to S10.

When it is judged that the valve is in a normal state, it is then judged whether or not the fuel cell system 10 is operating (S14). Whether or not the fuel cell system 10 is operating can be determined from an operation state flag or the like of the FC operation control unit 86 of the control device 80. Because the processing for the forced driving to prevent sticking of the humidifier bypass valve 50 is unknot related to the original power generation operation of the fuel cell system 10, it may be considered desirable that the forced driving to prevent sticking is performed when the fuel cell system 10 is not operating (offline). However, in this case, a time for processing the forced driving to prevent sticking must be specially set to conform with the operational schedule of the fuel cell system 10 by, for example, extending startup or shutdown processing. As a result, the rate of overall operation is reduced because of the processing time when the fuel cell system 10 is operating efficiently.

It is preferable that the forced driving to prevent sticking is performed during the steady operation of the fuel cell system 10. Therefore, when the judgment at S14 is YES, the procedure proceeds to S16, while, if the judgment at S14 is NO, the procedure returns to S10.

Then, it is judged whether or not the system is operating in a low-temperature mode (S16). This step is executed as a function of the operation mode judgment module 92 of the control device 80. When it is determined that the present operation mode is the low-temperature mode, processes such as a process to prevent water from freezing are performed, possibly including a process which may intermittently scavenge water by opening the humidifier bypass valve 50 at a predetermined frequency to forcibly direct the oxidizing gas to the oxidizing gas supply passage. Because the humidifier bypass valve 50 is therefore opened and closed in the low-temperature mode, it is not necessary to execute forced driving to prevent sticking. Therefore, when it is judged in S16 that the system is operating in the low-temperature mode, the procedure does not proceed to S18 but returns to S10. The low-temperature mode includes cases in which the outside air thermometer 60 measures a temperature less than a prescribed temperature $\theta_1$, and also cases wherein the selected state of the mode switch 82 is the low-temperature mode even though the measured temperature is greater than temperature $\theta_1$.

When it is judged in S16 that the system is not operating in the low-temperature mode, it is then judged whether or not the membrane impedance is below a threshold value (S18). This step is executed as a function of the impedance judgment module 94 of the control device 80. When the membrane impedance of the fuel battery cell is high, the membrane of the fuel battery cell is in a slightly dry state, and it would be undesirable to bypass the humidifier 46 to direct the oxidizing gas to the fuel cell stack 22, as this would likely contribute to further drying of the membrane. Therefore, it is determined that the humidifier bypass valve 50 is forcibly driven when the membrane impedance value is appropriately low and the membrane is in an appropriately wet state. As described above, the membrane impedance can be determined from the values detected by the current detector 68 and the voltage detector 70. The threshold value of the membrane impedance can be set according to the specifications or the like of the fuel cell stack 22. For example, the threshold value can be set in a range of from about $0.1\Omega$ to about $1\Omega$. When the judgment at S18 is NO, the procedure returns to S10.

When it is judged that the membrane impedance does not exceed the threshold value, it is then judged whether or not the temperature of the fuel cell stack 22 is below the threshold value (S20). This step is executed as a function of the FC temperature judgment module 96 of the control device 80. The temperature of the fuel cell stack 22 is detected by the cooling water thermometer 66. As described above, when the fuel cell stack 22 has a high temperature, the oxidizing gas has a high saturated steam pressure, and the oxidizing gas is slightly dry. Under such conditions, it is preferable that the oxidizing gas is not directed to the fuel cell stack 22 without first flowing through the humidifier 46. In other words, it is preferable that the humidifier bypass valve 50 is only opened when the temperature is appropriately low. The value for the low temperature is determined with respect to a tendency that the saturated steam pressure increases, and the threshold value can be selected from, for example, a range of from about 40 degrees C. to about 50 degree C.

When at S20 it is judged that the temperature of the fuel cell stack 22 does not exceed the threshold value, it is then judged whether or not the vehicle speed exceeds the threshold value (S22). This judgment is made because it is considered that the vehicle speed is associated with the background noise, and that, when the vehicle travels above a certain high speed, the operation noise of the humidifier bypass valve 50 would be unnoticeable to the driver and occupants of the vehicle as it would be lost in the running noise of the vehicle. For example, the threshold value of the vehicle speed can be set to a value in the range from about 30 km/h to about 40 km/h. Of course, a device for measuring the associated amount of the background noise, such as a noise level meter, can be disposed a standard based directly on a measured noise level, for example, about 30 dB, may be set. When the detected noise exceeds that level, the procedure proceeds to S24, while otherwise, if the is judgment at S22 is NO, the procedure returns to S10.

When the judgment at S22 is YES, forcible drive for the opening/closing processing for prevention of the sticking of the humidifier bypass valve 50 is executed for the first time (S24). When one opening/closing processing is completed, the procedure returns to S10, and the above-described processing is repeated. Thus, the defective operation due to sticking of the fluid circulating device of the fuel cell system 10 can be prevented.

What is claimed is:

1. A fuel cell system, comprising:
   at least one fluid drive device disposed in a fluid passage connected to a fuel cell main body that forcibly circulates fluid;
   an operation state judgment unit that judges whether or not the fuel cell main body is operating for power generation;
   a temperature detecting unit that detects a temperature of the fuel cell main body;
   an impedance detecting unit that detects the impedances of fuel battery cells in the fuel cell main body; and
   a forcible drive unit that counts a trip number, wherein a trip is defined as a time period between starting and stopping operation of the fuel cell main body for power generation, and
   wherein the forcible drive unit is programmed to forcibly drive the at least one fluid drive device regardless of whether the at least one fluid drive device is to be operated during an operation of the fuel cell main body if at least the following conditions are all true:
   (a) the counted number of trips is equal to or greater than a predetermined number of trips, which is equal to or greater than one; and
   (b) the fuel cell main body is operating for power generation; and
   (c) the temperature of the fuel cell main body does not exceed a predetermined temperature range; and
   (d) the impedances of the fuel battery cells do not exceed a predetermined impedance range.

2. A fuel cell system, comprising:
   at least one fluid drive device disposed in a fluid passage connected to a fuel cell main body that forcibly circulates fluid;
   an operation state judgment unit that judges whether or not the fuel cell main body is operating for power generation;
   a temperature detecting unit that detects a temperature of the fuel cell main body;
   An impedance detecting unit that detects the impedances of fuel battery cells in the fuel cell main body; and
   a forcible drive unit which measures a duration of non-use time since the at least one fluid drive device was last used, wherein the forcible drive unit is programmed to forcibly drive the at least one fluid drive device regardless of whether the at least one fluid drive device is to be operated during an operation of the fuel cell main body if at least the following conditions are all true:
   (a) the duration of non-use time exceeds a predetermined non-use time; and
   (b) the fuel cell main body is operating for power generation; and
   (c) the temperature of the fuel cell main body does not exceed a predetermined temperature range; and
   (d) the impedances of the fuel battery cells do not exceed a predetermined impedance range.

3. The fuel cell system according to claim 1, further comprising
   a background noise measuring unit that measures an associated amount related to background noise; and
   wherein the forcibly drive unit forcibly drives the at least one fluid drive device regardless of whether the at least one fluid drive device is operated during an operation of the fuel cell main body when it is judged that the background noise measured by the background noise measuring unit is largely exceeding a predetermined range.

4. The fuel cell system according to claim 2, further comprising:
   a background noise measuring unit that measures an associated amount related to background noise; and
   wherein the forcibly drive unit forcibly drives the at least one fluid drive device regardless of whether the at least one fluid drive device is operated during an operation of the fuel cell main body when it is judged that the background noise measured by the background noise measuring unit is largely exceeding a predetermined range.

\* \* \* \* \*